Aug. 14, 1956     E. G. ELLSTROM     2,758,776
PALLETIZED CONTAINERS

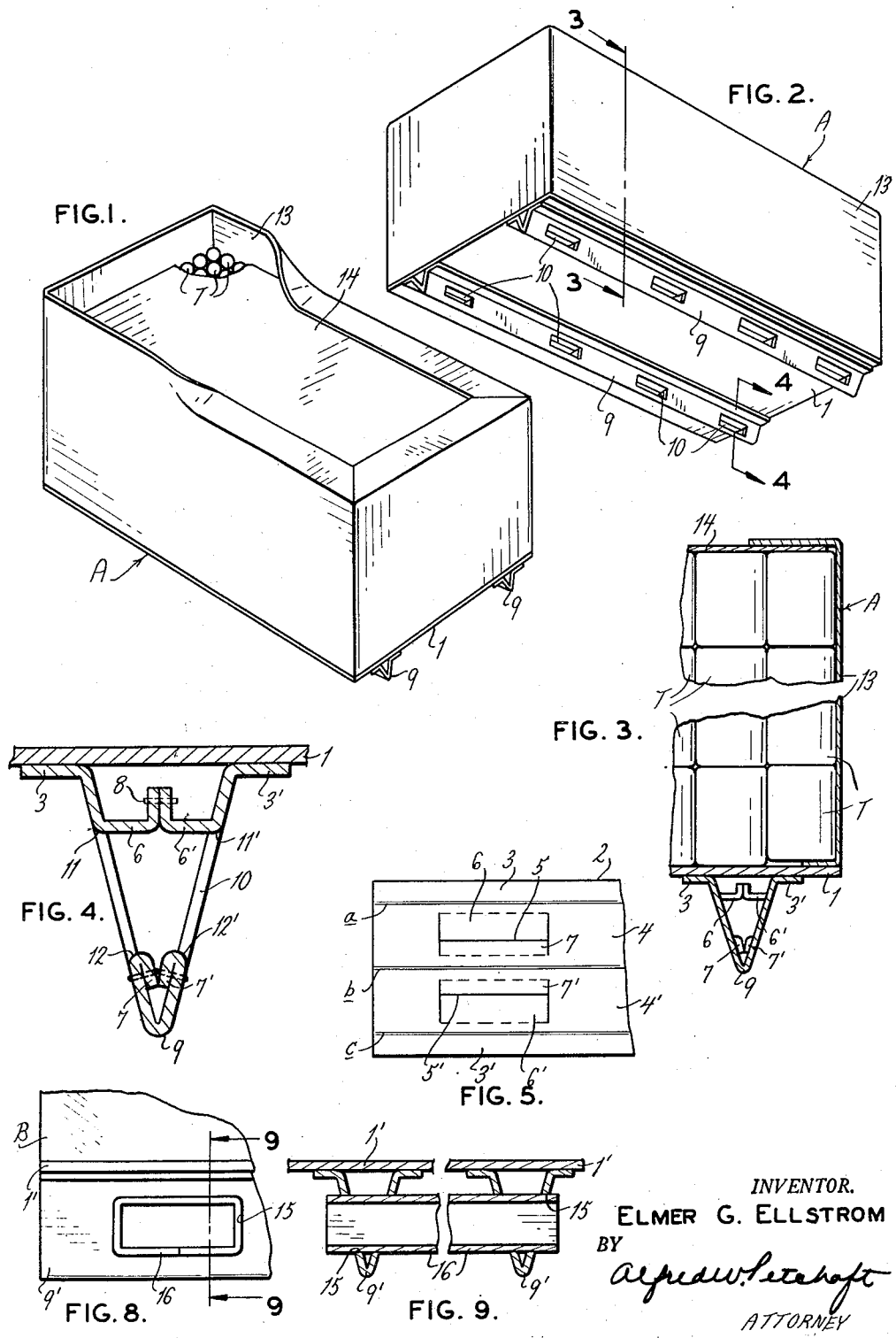

Filed Dec. 15, 1952     2 Sheets-Sheet 2

INVENTOR
ELMER G ELLSTROM
BY
*Alfred W. Petchaft*
ATTORNEY

United States Patent Office 2,758,776
Patented Aug. 14, 1956

2,758,776

PALLETIZED CONTAINERS

Elmer G. Ellstrom, Chicago, Ill., assignor of one-half to W. A. Meyer, La Grange, Ill.; Clarence A. Tevander administrator of said Elmer G. Ellstrom, deceased Application December 15, 1952, Serial No. 326,020

3 Claims. (Cl. 229—23)

This invention relates to certain new and useful improvements in palletized containers.

In many industries, it is a common practice to package a large number of individually packaged articles of merchandise in a suitable shipping carton which may be transported as a unit to some particular customer or consignee. Frequently, the size and contents of such shipping containers must be limited in terms of the total weight and size of the container, so that it will not become too heavy or cumbersome for manual handling as it is loaded into and unloaded from the freight car or truck by which it is transported. In order to overcome this difficulty, many heavy objects, such as machinery, steel products, and the like, are "palletized," that is to say, they are tightly secured by steel strapping or other suitable means to skids made of wood or metal and having short legs by which the entire load is elevated from the floor to facilitate handling by means of fork-lift trucks and similar mechanical equipment. The technique of palletizing shipments has become quite widespread, but has encountered limitations in terms of cost and convenience.

Many types of merchandise cannot readily be palletized by the use of existing types of skids because the cost of the skid is excessive in relation to the value of the load supported thereon. Frequently, the merchandise units are small, light-weight, and relatively bulky and consequently are difficult to attach to a pallet in any simple, convenient, and economical manner.

One example of this type of problem is to be found in the canning industry. Tins can ordinarily must be shipped by freight car or motor truck to the food processing plant where they are ultimately filled and sealed. Such goods are frequently lithographed and care must be observed to avoid damaging the lithographed exteriors in the course of shipment. It is obviously impractical to place a large quantity of empty tin cans in some type of corrugated box or shipping container for reasons of expense and, consequently, the practice has grown up of stacking a large quantity of loose tin cans in a paper-lined freight car or truck body, but this procedure also becomes relatively expensive as the packing and unpacking must be carried out by hand. While most can manufacturers are able to invest in elaborate mechanical handling equipment for loading the transporting vehicle, the average customer cannot afford such equipment for unloading purposes and, as a result, is required to unload his shipment of cans by hand, so to speak. There are many industries which are faced with similar shipping problems.

It is, therefore, the primary object of the present invention to provide a palletized container which is extremely rugged and durable in construction and is nevertheless cheap and economical in cost.

It is another object of the present invention to provide a palletized container which can be folded into an extremely compact package when not in use and can be quickly and conveniently opened up to form a container having relatively large volumetric capacity and which will support a very substantial load in elevated position suitable for handling by fork-lift trucks and similar mechanical equipment.

It is also an object of the present invention to provide a palletized container which is extremely compact when not in use, so that it will occupy a relatively small amount of space during shipment and storage prior to use and may, under proper circumstances, even be folded up again into compact form after use for return shipment to the point of origin for subsequent reuse.

With the above and other objects in view, my invention resides in the novel features of form, construction, arrangement, and combination of parts presently described and pointed out in the claims.

In the accompanying drawing—

Figure 1 is a perspective view of a palletized container constructed in accordance with and embodying the present invention;

Figure 2 is a perspective view of a palletized container when viewed from the under side;

Figure 6:
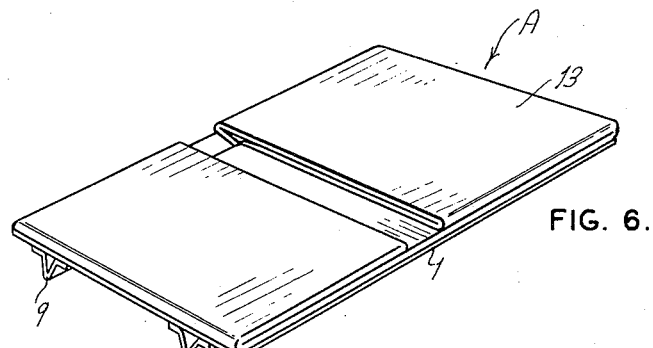
Figure 7:
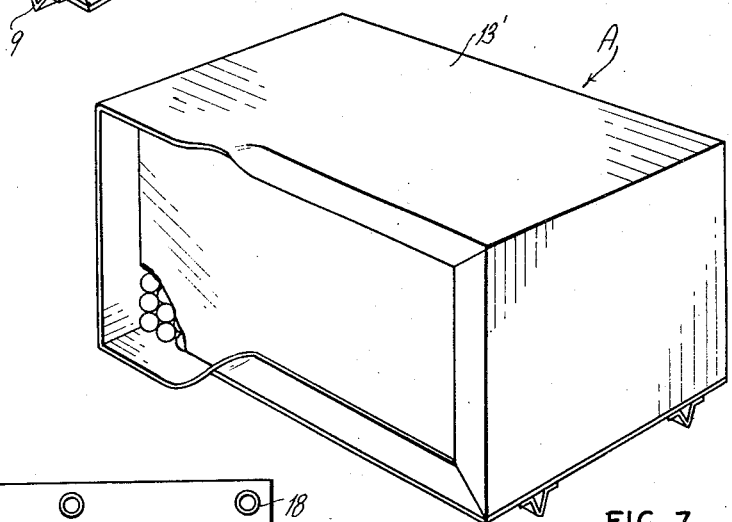

Figures 3 and 4 are fragmentary sectional views taken along lines 3—3 and 4—4, respectively, of Figure 2;

Figure 5 is a fragmentary plan view of the base rail member in flattened position prior to folding and assembly;

Figure 6 is a perspective view of the palletized container in collapsed or inoperative position;

Figure 7 is a perspective view of a modified form of palletized container constructed in accordance with and embodying the present invention;

Figure 8 is a fragmentary elevational view of another modified form of palletized container constructed in accordance with and embodying the present invention;

Figure 9 is a fragmentary sectional view taken along line 9—9 of Figure 8.

Figure 10:
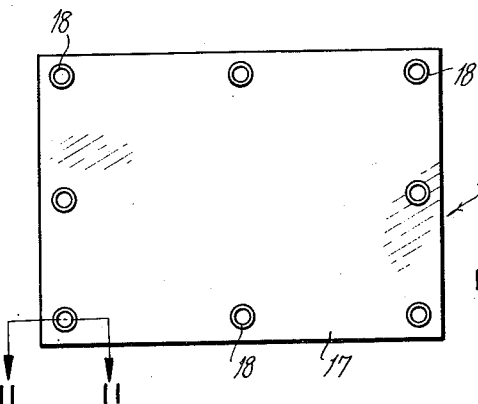
Figure 11:
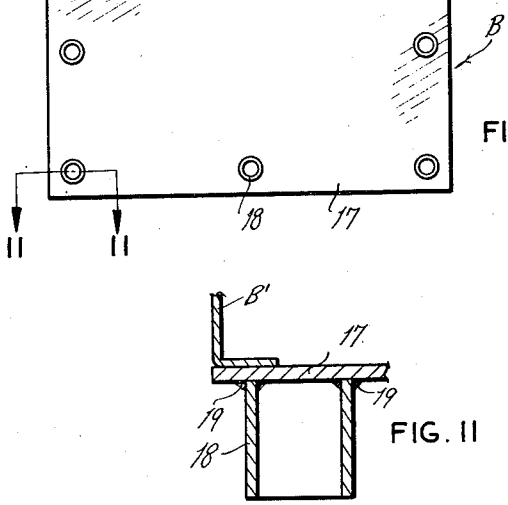

Figure 10 is a fragmentary bottom plan view of a further modified form of palletized container constructed in accordance with and embodying the present invention; and Figure 11 is a fragmentary sectional view taken along line 11—11 of Figure 10.

Referring now in more detail and by reference characters to the drawing, which illustrates practical embodiments of the present invention, A designates a palletized container comprising a flat rectangular base panel 1 formed of heavy cardboard or corrugated paperboard or other similar material. Also formed from cardboard or corrugated paperboard are two initially flat elongated rail-forming members 2 having longitudinally extending score lines a, b, and c sub-dividing each member 2 into marginal flaps 3, 3', and leg-forming panels 4, 4'. At uniformly spaced intervals, the rail-forming members are die-cut with somewhat H-shaped slits 5, 5', which, in effect, form flaps 6, 7, and 6', 7', respectively. The rail-forming strips 2 are folded up in somewhat V-shaped configuration and the flaps 7, 7', are folded in and stapled down. Similarly, the flaps 6, 6', are folded in and upwardly and stapled to each other by a series of staples 8. Finally, the marginal flaps 3, 3', are folded outwardly and adhesively or otherwise rigidly secured upon the under face of the base panel 1 in the provision of longitudinal rails 9, substantially as shown in Figure 4.

As will be seen by reference to Figure 2, the folding in of the flaps 6, 6', 7, 7', form a series of laterally aligned rectangular apertures 10 which are preferably of such size and dimension to accommodate the fork members of a fork-lift truck. Furthermore, it should be noted in this connection that the turning in of the flaps 6, 6', 7, 7', in effect, form outwardly presented rounded edges or shoulders 11, 11', 12, 12', to facilitate entry and withdrawal of the fork-lift members. It may also be noted that the rails 9 are arranged in spaced parallel relation, so that the fork elements of a conventional fork-lift truck can be inserted from the cross ends of the palletized container A as well as through the apertures 10.

Adhesively secured upon the upper face of the base panel 1 around the entire periphery thereof is a continuous tubular strip of heavy kraft paper 13 forming, in effect, flexible side walls and providing a bag-like container, which, when erect, will have substantial capacity and may be filled with a series of packages, such as the empty tin cans T shown in Figure 1. Also provided for co-operation with the member 13 is a rectangular top panel 14 which may be formed of heavy kraft paper, cardboard, or other suitable material and is adapted to be inserted on top of the cans or other merchandise, so that the marginal edges of the member 13 can be folded over and pasted down in closure-forming relation, substantially as shown in Figure 1. In folding the upper marginal edges of the member 13 down into closure-forming position, it is important to draw the side walls of the container tightly around the merchandise, so that the contents will be snugly housed and the resulting package will be a compact unit in which the side walls formed by the member 13 and the top wall 14 will be drawn taut to impart maximum strength to the container structure.

The palletized container A, after having been completely manufactured, may be collapsed with the flexible side wall forming strip 13 folded up flatwise upon the upper face of the base panel 1, substantially as shown in Figure 6. When in this collapsed or inoperative position, a relatively large number of the palletized containers A may be shipped from the point of origin to the user at relatively economical cost. Furthermore, after having been opened up and filled with merchandise, such as, for example, empty tin cans, and delivered to the user, the palletized container can be again folded up and shipped back for reuse. Inasmuch as the palletized containers A are, in and of themselves, relatively inexpensive, reuse may not be of major significance, particularly where the shipments traveled over long distances and it consequently becomes necessary to return the palletized containers A through an equally long distance. On the other hand, many shipments are made between close lying plants within an industrial area, so that the distances and consequent shipping costs involved in returning the containers for reuse becomes monetarily expedient. Under such circumstances, the reusability of the palletized containers of the present invention constitutes a very important and significant advantage.

It is also possible to provide a modified form of palletized container A' which is substantially similar in all respects to the previously described palletized container A except that it includes a kraft paper side wall forming element 13' arranged to open laterally in a sideward direction rather than horizontally upwardly as is the case with the previously described palletized container A. This type of sideward opening is of substantial advantage for certain types of merchandise which can be mechanically inserted into the container for automatically loading equipment.

If desired, it is possible to provide a modified form of palletized container B, as shown in Figures 8 and 9, which is substantially identical in all respects with the previously described container A, having a base panel 1' provided upon its under surface with two spaced parallel base rails 9' of V-shaped cross-sectional shape and being formed of cardboard or corrugated paperboard in substantially the same manner as the previously described base rails 9.

The base rails 9', however, are merely die-cut to provide a series of uniformly spaced rectangular apertures 15 arranged so that each such aperture 15 of one base rail 9' is aligned or paired with a corresponding aperture 15 of the other base rail 9' and a tightly fitting rectangular tube 16 is inserted through such paired apertures 15 in the manner shown in Figure 7. It will be noted that the tubes 16 are only long enough to project for short distances outwardly from the base rails 9'. The internal dimensions of the tubes 16 are such as to accommodate freely the tines or forks of conventional fork-lift equipment.

It is also possible to provide a further modified form of palletized container B', which is similar in all principal respects to the previously described container A, and includes a base panel 17 provided on its under face with a plurality of short upright tubular legs 18 or cylinders formed of cardboard, fiberboard, or similar material and secured in place by a fillet of adhesive 19, as best seen in Figures 10 and 11.

It should be understood that changes and modifications in the form, construction, arrangement, and combination of the several parts of the palletized container may be made and substituted for those herein shown and described without departing from the nature and principle of my invention.

Having thus described my invention, what I claim and desire to secure by Letters Patent is:

1. A palletized container comprising a substantially rigid flat base panel provided upon its under face with a plurality of depending longitudinally extending rail members of V-shaped cross-sectional configuration adapted to elevate the base panel above a floor or supporting structure upon which the palletized container may rest, said rail members having a plurality of laterally opening apertures, each aperture of one rail being transversely aligned with a corresponding aperture of the other rail, an elongated tubular member extending through and tightly fitted within the pairs of aligned apertures, and a flexible side wall-forming member secured peripherally around the base panel and adapted to extend upwardly above the base panel to provide a container-forming enclosure.

2. A palletized container comprising a substantially rigid base panel having a substantially continuous flat surface and provided upon its under face with a plurality of spaced parallel longitudinally extending rail members of V-shaped cross-sectional configuration adapted to elevate the base panel above a floor or supporting structure upon which the palletized container may rest, said rails each having laterally projecting flanges along their longitudinal margins, said flanges being secured to the under face of the top panel in spaced parallel relation whereby to hold the rails in upright position, the angularly disposed side walls of the V-shaped rails being transversely connected by reinforcing elements which are located intermediate the flanges and the floor-engaging margin which forms the apex of the V, and a wall-forming member consisting of a heavy pliable paper tube turned inwardly around its entire periphery at one end in the formation of a continuous flange, said flange being adhesively secured peripherally around the base panel and said paper tube being adapted to extend upwardly above the base panel to provide a container-forming enclosure.

3. A palletized container comprising a substantially rigid flat base panel provided upon its under face with a plurality of depending longitudinally extending rail members of V-shaped cross-sectional configuration adapted to elevate the base panel above a floor or supporting structure upon which the palletized container may rest, said rails each having laterally projecting flanges along their longitudinal margins, said flanges being secured to the under face of the top panel in spaced parallel relation whereby to hold the rails in upright position, said rail members having a plurality of laterally opening apertures through which an elongated lifting tool may be freely inserted and withdrawn, said apertures being completely within the confines of the rail members so as to entirely encircle the lifting tool, the angularly disposed side walls of the V-shaped rails being transversely connected by reinforcing elements extending inwardly and thereacross between the upper margins of the apertures, and a wall-forming member consisting of a heavy pliable paper tube turned inwardly around its entire periphery at one end in the formation of a continuous flange, said flange being adhesively secured peripherally around the base panel and said paper tube being adapted to extend upwardly above the base panel to provide a container-forming enclosure.

References Cited in the file of this patent

UNITED STATES PATENTS

| | | | |
|---|---|---|---|
| 915,764 | Harbeck | Mar. 23, | 1909 |
| 1,605,901 | O'Neil | Nov. 2, | 1926 |
| 2,425,642 | Ringler | Aug. 12, | 1947 |
| 2,447,542 | Seward | Aug. 24, | 1948 |
| 2,534,011 | Frye | Dec. 12, | 1950 |
| 2,594,287 | Budd | Apr. 29, | 1952 |
| 2,607,475 | Budd | Aug. 19, | 1952 |

FOREIGN PATENTS

| | | | |
|---|---|---|---|
| 662,233 | Great Britain | Dec. 5, | 1951 |